Figure 1:
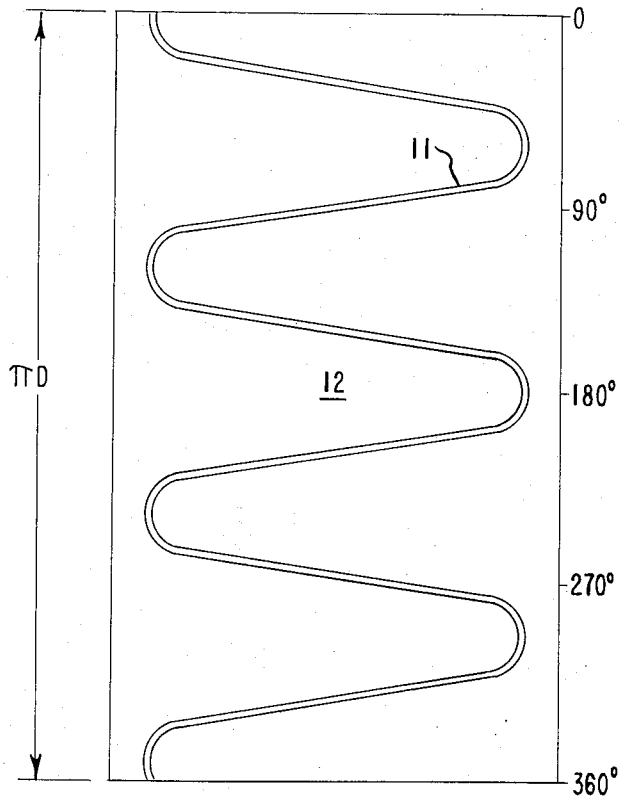
Figure 2:
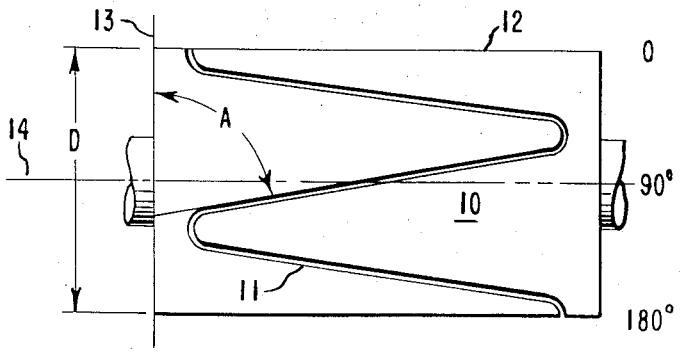

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED APRIL 16, 1974

921 O.G. 867

T921,017
APPARATUS

Darryl Edward Helton, 50 Anglin Drive, Robscott Manor, Newark, Del. 19711

Filed Nov. 6, 1972, Ser. No. 303,827
Int. Cl. B65h *54/28*
U.S. Cl. 242—43
1 Sheet Drawing. 6 Pages Specification

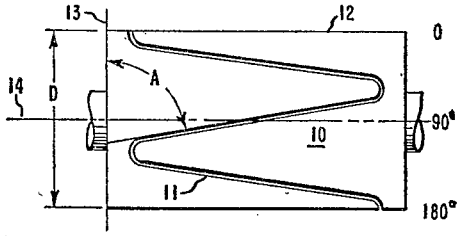

A barrel cam for use in a yarn winding apparatus is provided with a generally helical continuous groove in its surface. The helical portion of the groove being disposed at an angle in the range of from about 58 degrees to about 78 degrees with respect to a plane perpendicular to the longitudinal axis of the barrel cam. The cam groove is machined and its surface finished by conventional techniques to a surface finish of from about 25 to about 40 microinches having somewhat of an orange peel appearance.

APPARATUS

Filed Nov. 6, 1972